(12) United States Patent
Wu et al.

(10) Patent No.: US 11,579,310 B2
(45) Date of Patent: Feb. 14, 2023

(54) HIGH-POWER FLEXIBLE-POLARIZATION IN-ORBIT-CALIBRATION SATELLITE PAYLOAD

(71) Applicant: MacDonald, Dettwiler and Associates Corporation, Ste-Anne-de-Bellevue (CA)

(72) Inventors: Haiqing Wu, Dollard-des-Ormeaux (CA); Jean-François Blain, Ile-Bizard (CA); Claude Gingras, Pierrefonds (CA); Michel Tremblay, St-Eustache (CA)

(73) Assignee: MACDONALD, DETTWILER AND ASSOCIATES CORPORATION, Ste-Anne-de-Bellevue (CA)

( * ) Notice: Subject to any disclaimer, the term of this patent is extended or adjusted under 35 U.S.C. 154(b) by 0 days.

(21) Appl. No.: 17/510,621

(22) Filed: Oct. 26, 2021

(65) Prior Publication Data

US 2022/0043160 A1 Feb. 10, 2022

Related U.S. Application Data

(62) Division of application No. 16/887,012, filed on May 29, 2020, now Pat. No. 11,194,054.

(60) Provisional application No. 62/854,150, filed on May 29, 2019.

(51) Int. Cl.
*G01S 19/23* (2010.01)
*H04B 7/185* (2006.01)
*H04B 7/204* (2006.01)

(52) U.S. Cl.
CPC ........ *G01S 19/235* (2013.01); *H04B 7/18515* (2013.01); *H04B 7/18578* (2013.01); *H04B 7/2041* (2013.01)

(58) Field of Classification Search
CPC ............ H04B 7/18515; H04B 7/18578; H04B 7/2041; G01S 19/235
See application file for complete search history.

(56) References Cited

U.S. PATENT DOCUMENTS

| | | | |
|---|---|---|---|
| 4,499,585 A * | 2/1985 | Mosley | H04L 27/2014 375/302 |
| 4,630,058 A | 12/1986 | Brown | |
| 6,108,319 A | 8/2000 | Campanella | |
| 8,067,738 B1 * | 11/2011 | Heath | G01J 3/36 250/338.1 |
| 2005/0178874 A1 | 8/2005 | Wang et al. | |

(Continued)

*Primary Examiner* — Raymond S Dean
(74) *Attorney, Agent, or Firm* — Praxis (57) ABSTRACT

A system of architecture, apparatus and calibration method is invented for high-power flexible-polarization payload for satellite communications. The system comprises onboard phase-tracked apparatus, flexible polarization mechanism, and in-orbit calibration method. The power combining and polarization performance of the phase-tracked payload is monitored on ground by measuring the cross-polarization discrimination (XPD) and/or axial ratio (AR). The high performance over the life is achieved by optimization of the XPD or AR on ground and adjusting complex gain of the transponders. The high-power flexible-polarization in-orbit-calibration payload may be applied but not limited to UHF, L, S, C, X, Ku and Ka-band high power satellite systems.

3 Claims, 10 Drawing Sheets

(56) References Cited

U.S. PATENT DOCUMENTS

| | | | |
|---|---|---|---|
| 2006/0135153 A1* | 6/2006 | Chen | H04B 7/18515 |
| | | | 455/427 |
| 2006/0145024 A1 | 7/2006 | Kosmas | |
| 2010/0164782 A1* | 7/2010 | Saha | H01Q 3/267 |
| | | | 342/174 |
| 2012/0027055 A1 | 2/2012 | Lang et al. | |
| 2015/0263803 A1* | 9/2015 | Amos | H04W 16/26 |
| | | | 370/316 |
| 2017/0026006 A1 | 1/2017 | Roukos et al. | |
| 2017/0366263 A1* | 12/2017 | Turgeon | H04B 7/1858 |
| 2018/0183397 A1 | 6/2018 | Wu et al. | |
| 2019/0181945 A1* | 6/2019 | Spirtus | H04B 7/18543 |

* cited by examiner

Fig.10

HIGH-POWER FLEXIBLE-POLARIZATION IN-ORBIT-CALIBRATION SATELLITE PAYLOAD

CROSS REFERENCE TO RELATED APPLICATIONS

This application is a divisional application of parent application Ser. No. 16/887,012 filed on May 29, 2020 which claims priority of U.S. Provisional Application for Patent No. 62/854,150 filed on May 29, 2019, the content of both of which is incorporated herein by reference in its entirety.

FIELD OF THE INVENTION

This invention generally relates to satellite communication systems, and particularly to the architecture, polarization mechanism, and in-orbit calibration method for a high-power phase-tracked communication payload.

BACKGROUND OF THE INVENTION

The evolution to more advanced satellite systems, in particular the high data rate and high confidentiality communication systems, results in a need of high transmit power and flexible polarization communication payloads.

Figure 1:
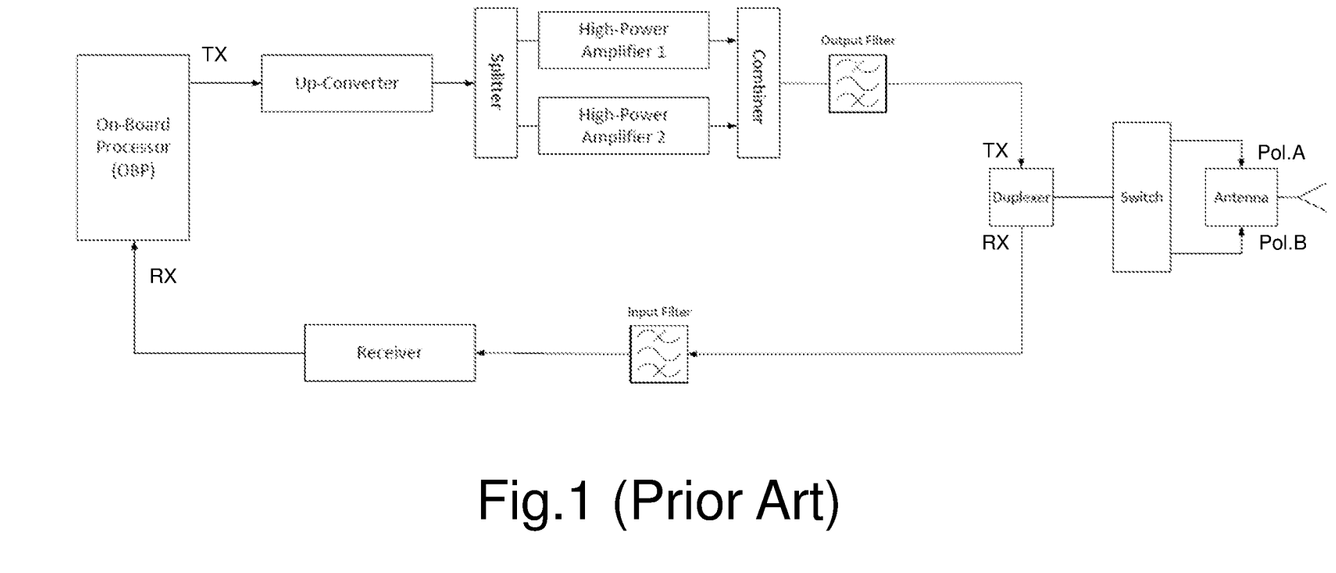
FIG. 1 is a schematic block-diagram of a generic communication payload of the prior art with Transmit & Receive chains and a dual-polarization antenna.

An example of a schematic block-diagram of a generic communication payload is shown in FIG. 1. This generic payload comprises a dual-polarization antenna, transmit (TX) chain, receive (RX) chain, and a centralized On-Board Processor (OBP) that processes the TX and RX signals. The transmit chain comprises an up-converter, combined high-power amplifiers and an output filter. The receive chain comprises an input filter and a receiver. A duplexer is used to segregate the TX and RX signals. A high-power RF (Radio-Frequency) switch is used for antenna polarization selection. Either polarization type "A" or polarization type "B" can be selected. The polarization can be of any type: linear, circular, etc.

One drawback of the generic satellite payload (FIG. 1) is that the total output power is limited by the power handling capability of the equipment in the output chain after the power combiner. Another drawback is that the output combiner and the polarization selection switch introduce an additional insertion loss in the TX chain that reduces the communication data rate. In addition, the switching of the polarizations may cause a temporary loss of signals which is unwanted (not desirable) in certain applications.

Accordingly, there is a need of an improved payload architecture, apparatus and calibration method for high-power flexible-polarization payload for satellite communications.

SUMMARY OF THE INVENTION

It is therefore a general object of the present invention to provide an improved payload architecture, apparatus and calibration method for high-power flexible-polarization payload for satellite communications, as exemplified in different embodiments shown in FIGS. 2 to 10, to obviate the above-mentioned drawbacks and problems of the common payload (an example of which being shown in FIG. 1).

An advantage of the present invention is that the high-power flexible-polarization in-orbit-calibration payload may be applied but not limited to high power satellite systems operating at UHF, L, S, C, X, Ku and Ka-band signal frequencies of the RF/microwave signals.

The present invention provides a system architecture, onboard and/or ground calibration apparatus and method for high-power flexible-polarization payload for satellite communications. Another advantage of the present invention is that the system comprises onboard phase-tracked apparatus, flexible polarization mechanism, and in-orbit calibration method to allow calibration over time and temperature variations. The invention is applicable to satellite communications in simplex, half-duplex or full duplex modes.

A further advantage of the present invention is that the onboard phase-tracked payload of the current invention applies the power combining at the antenna aperture (RF waves from both X and Y components are coherently added at antenna aperture, in space, and, by changing the amplitude and phase of each component, the polarization of the combined waves can be controlled to obtain the Left-Hand Circular Polarization (LHCP) or Right-Hand Circular Polarization (RHCP) and the performance degradation can be calibrated), thus significantly increasing the high-power capability of the system. In addition, the RF power combiner and high-power switch are no longer needed, therefore reducing the TX output circuit insertion losses. Furthermore, the polarization selection switch may be implemented within the OBP, permitting seamless switching without any loss of RF signal during polarization selection switching, thereby providing increased communication security.

Yet another advantage of the present invention is that it also provides a system of calibrating a communication payload, the system comprising: providing a means to measure the cross-polarization discrimination (XPD) and/or axial ratio (AR) by ground systems; providing a means to optimize XPD/AR performance using ground computer; up-linking the calculated gain and phase adjustment data via a conventional or payload-specific telecommand (TC) link, whichever is available; and providing a means to vary output signal gain (amplitude) and phase on the payload transmit path using OBP or Gain & Phase Adjusters.

A further advantage of the present invention is that whenever the TX and RX frequencies can be directly processed by the OBP, the functions of the low power electronics such as up-converters and receivers can be incorporated into the OBP, and therefore the up-converters and receivers become optional.

According to an aspect of the present invention there is provided a high-power flexible-polarization satellite payload system for satellite communications, the system comprising:
a centralized On-Board Processor (OBP) connecting to a transmit chain having a first and a second transmit paths and a receive chain having a first and a second receive paths, said first transmit and first receive paths connecting to a first transmit/receive duplexer, said second transmit and second receive paths connecting to a second transmit/receive duplexer, said first and second transmit/receive duplexer connecting to a two polarization antenna for transmitting and receiving signals;
said first and second transmit paths transmitting an in-phase and a quadrature phase output signals, respectively, said first and second receive paths receiving an in-phase and a quadrature phase input signals, respectively; and
a phase-tracked apparatus adjusting a respective phase and/or amplitude of said in-phase and quadrature phase output signals in said transmit chain for power combination of said in-phase and quadrature phase output signals at said two-polarization antenna, and a respective phase of said in-phase and quadrature phase input signals in said receive chain.

In one embodiment, the phase-tracked apparatus includes, in each said first and second receive paths, a fixed phase adjuster (or trimmer) connected between a quadrature hybrid coupler and a respective one of said first and second transmit/receive duplexers.

Conveniently:
said transmit chain includes, in each said first and second transmit paths, a phase-tracked up-converter connecting to the OBP and connected to a phase-tracked high-power amplifier connected to a phase-tracked filter connecting to a respective said first and second transmit/receive duplexers, and said receive chain includes either a polarization selection switch connected to a common input filter connected to a common receiver connecting to the OBP or, for each said first and second receive paths, an input filter connected to a receiver connecting to the OBP;
and wherein said phase-tracked apparatus includes a frequency generation unit connecting to the OBP and providing a respective phase-tracked local oscillator signal to each said phase-tracked up-converters and either a local oscillator signal to said common receiver or a respective local oscillator signal to each said receiver, respectively.

Alternatively:
in said transmit chain, said OBP connects to either, in each said first and second transmit paths, an up-converter connecting to, or a common up-converter connecting to a quadrature hybrid connecting to, in each said first and second transmit paths, a gain & phase adjuster connecting to a phase-tracked high-power amplifier connected to a phase-tracked filter connecting to a respective said first and second transmit/receive duplexers;
and wherein, in said receive chain, said quadrature hybrid coupler connects to either a polarization selection switch connected to a common input filter connected to a common receiver connecting to the OBP or, for each said first and second receive paths, an input filter connected to a receiver connecting to the OBP.

In one embodiment, the OBP determines the polarization of at least one of said in-phase and a quadrature phase output signals of the first and second transmit paths and said in-phase and a quadrature phase input signals of the first and second receive paths.

In one embodiment, at least one of the transmit and receive chains includes a polarization selection switch.

In one embodiment, the said OBP determines the polarization of one of said in-phase and a quadrature phase output signals of the first and second transmit paths and said in-phase and a quadrature phase input signals of the first and second receive paths, and the other one of the transmit and receive chains includes a polarization selection switch.

In one embodiment, the system further includes a telecommand satellite link communicating with a ground station receiving said power combination of said in-phase and quadrature phase output signals, said ground station including:
a measurement unit receiving the power combination of said in-phase and quadrature phase output signals and measuring cross-polarization discrimination and/or axial ratio performance of the system;
a ground computing unit receiving and analyzing the measured system performance from the measurement unit by determining if the measured performance is either within a predetermined requirement range or performance optimization reachable to stop calibration, and, if not, generating a command signal with compensation adjustments of respective said phase and/or amplitude of said in-phase and quadrature phase output signals for up-link communication of said command signal via the telecommand satellite link.

Conveniently, the performance optimization being reachable is determined using a search method to iteratively optimizing the measured system performance.

According to another aspect of the present invention there is provided a method of calibrating a high-power flexible-polarization satellite payload system as claimed in claim 1, the method comprising the steps of:
measuring cross-polarization discrimination and/or axial ratio performance of the system on the ground;
determining if the measured system performance is within a predetermined requirement range to stop calibration, if not, iteratively optimizing the measured system performance and determining if optimum system performance is reachable to stop calibration, and, if not, generating a command signal with compensation adjustments of respective said phase and/or amplitude of said in-phase and quadrature phase output signals; and
up-linking said command signal to the system via telecommand satellite link and repeating the preceding steps.

Conveniently, iteratively optimizing is performed using a search method.

Conveniently, the search method is one of a pattern search, a trust-region search, and a line search.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 8 is a schematic block-diagram of the calibration scheme for high-power flexible-polarization payload application. FIG. 8 is similar to FIG. 2 herein with the addition of illustration of telemetry/telecommand (TM/TC) link and ground system.

DETAILED DESCRIPTION OF THE INVENTION

With reference to the annexed drawings the preferred embodiment of the present invention will be herein described for indicative purpose and by no means as of limitation.

FIGS. 2 to 8 show different illustrative embodiments 10 of schematic block-diagrams of high-power (typically above 200 Watts) flexible-polarization communication antenna systems for spacecrafts with Transmit (TX) 12 & Receive (RX) 14 chains payload in accordance with the present invention.

Figure 2:
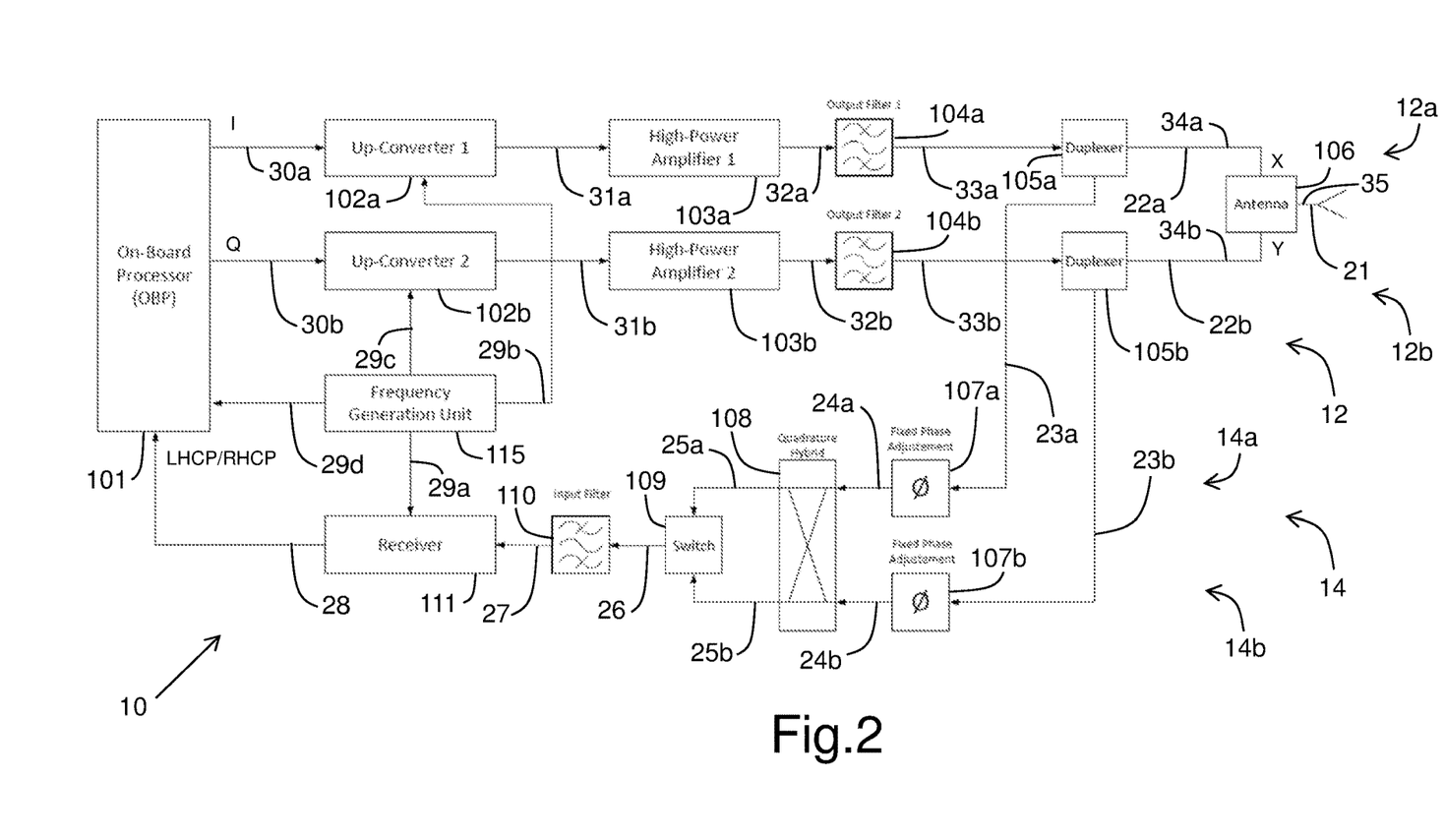
FIG. 2 is a schematic block-diagram for high-power flexible-polarization payload application with a polarization selection switch on the receive path in accordance with an illustrative embodiment of the present invention.

FIG. 2 is a schematic block-diagram for high-power flexible-polarization payload application with a polarization selection switch 109 on the receive chain 14 in accordance with an illustrative embodiment of the present invention. The transmit chain 12 polarization is defined by the On-Board Processor (OBP) I & Q (In-phase & Quadrature phase) outputs which have their own separate transmit paths 12*a*, 12*b*. Each transmit path comprises an upconverter 102*a*, 102*b*, high-power amplifier 103*a*, 103*b* and output filter 104*a*, 104*b*. A duplexer 105*a*, 105*b* is used to segregate the TX and RX chains near the antenna 106. Both receive paths 14*a*, 14*b* of the receive chain 14 have fixed phase adjusters or trimmers 107*a*, 107*b* and are combined in a quadrature hybrid 108. A switch 109 is typically used to select which branch of the hybrid is used and, at the same time, which polarization is selected. The RX signal 26 is then filtered by an input filter 110 before entering the receiver 111.

Phase tracking, via a phase-tracked apparatus, is mandatory between the I & Q signals in the transmit paths 12*a*, 12*b*. Phase tracking is also necessary for the associated Local Oscillator (LO) signals 29*a*-29*c* used in the frequency conversion and generated by the Frequency Generation Unit (FGU) 115 of the present embodiment. This FGU unit 115 is used to generate the LO signals of the frequency translation performed by the upconverters 102*a*, 102*b* and receiver 111.

An in-orbit calibration is performed by adjusting the OBP I & Q output signals. The actual calibration scheme and algorithm are described herein below and on FIGS. 8 and 9.

Figure 3:
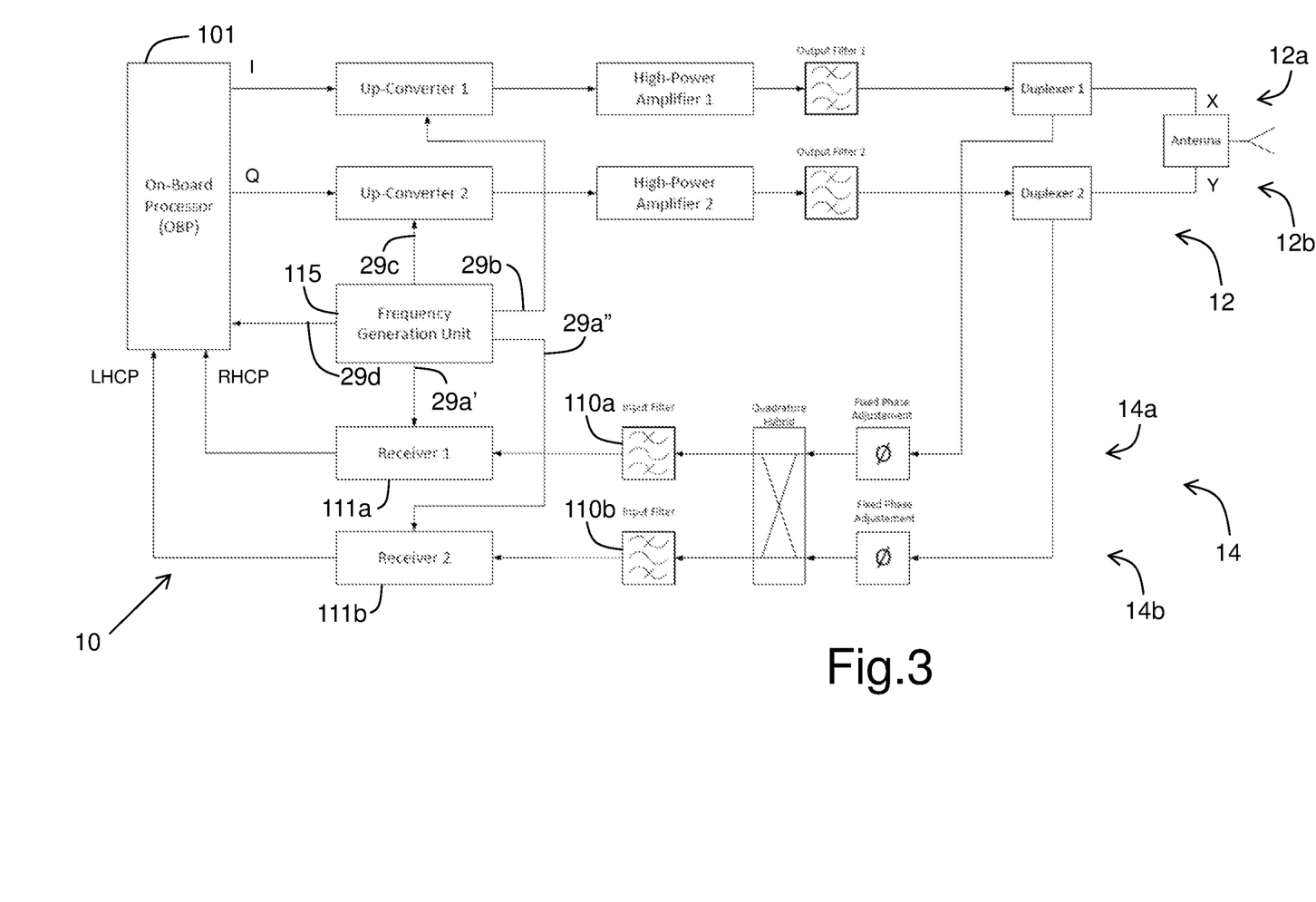
FIG. 3 is a schematic block-diagram for high-power flexible-polarization payload application with the receive path polarization selected by the OBP in accordance with another illustrative embodiment of the present invention.

FIG. 3 is a schematic block-diagram for high-power flexible-polarization payload application with the receive path polarization selected by the OBP 101 in accordance with a second illustrative embodiment. This OBP receive chain 14, with each receive path 14*a*, 14*b* includes an input filter 110*a*, 110*b* and a receiver 111*a*, 111*b* (each connected to the FGU 115 to receive their respective LO signal 29*a*', 29*a*"), is what differs the block-diagram of FIG. 3 with the previous one of FIG. 2. The latter was using a selection switch 109 in the receive chain. The remaining constituents of FIG. 3 are the same as FIG. 2. Refer to its description and functions in the text above.

The advantages of OBP selection are typically in two folds: one is the improved gain-over-temperature (G/T) performance with the removal of the selection switch in the RX RF chain. The second advantage is that the removal of the RF selection switch 109 could reduce the loss of the RX signal during switching. On the other hand, an OBP selection disadvantage is the increased hardware complexity with an additional filter and receiver.

Figure 4:
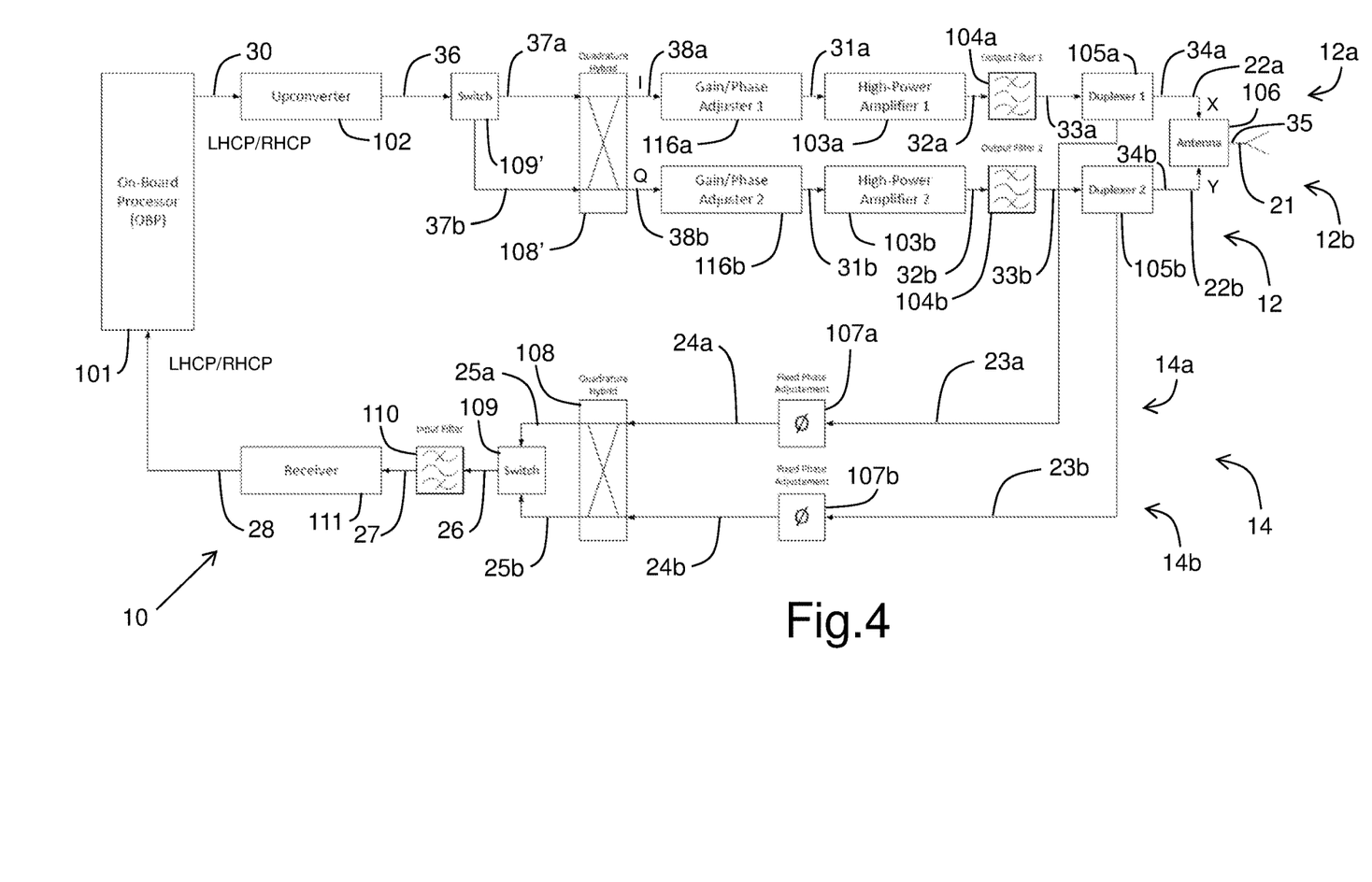
FIG. 4 is a schematic block-diagram for high-power flexible-polarization payload application. Gain & phase adjusters are present in the transmit paths. Both transmit and receive path polarizations are selected by a switch in accordance with another illustrative embodiment of the present invention.

FIG. 4 is a schematic block-diagram for high-power flexible-polarization payload application. Gain & phase adjusters 116*a*, 116*b* are present in the transmit paths 12*a*, 12*b*. Both transmit and receive path polarizations are selected by a switch 109', 109 in accordance with another illustrative embodiment. Both transmit 12 and receive 14 chains have a switch 109', 109 and quadrature hybrid 108', 108 to allow polarization selection while using only one receiver 111 and up-converter 102. This transmit signal 30 is treated by the common up-converter 102 which translates the low frequency of the OBP output to TX frequency (if needed), and performs suitable signal conditioning on the RF/microwave signal 36. Then the switch 109' selects the polarization of the signals 37*a*, 37*b* entering the quadrature hybrid 108' for phase conditioning of the transmit I & Q signals 38*a*, 38*b*. The receive paths 14*a*, 14*b* have fixed phase adjustments 107*a*, 107*b*. The transmit I & Q paths 12*a*, 12*b* have gain & phase adjusters 116*a*, 116*b* before the high-power amplifiers 103*a*, 103*b*. The receive 22*a*, 22*b* and transmit 33*a*, 33*b* signals are segregated by a duplexer 105*a*, 105*b* in a similar manner as other payload systems described herein.

Phase tracking is mandatory between the I & Q signals 38*a*, 38*b* in the transmit paths 12*a*, 12*b*. These I & Q signals 38*a*, 38*b* are associated to the quadrature hybrid output ports. Both transmit paths 12*a*, 12*b* from the quadrature hybrid 108' must phase track over life and temperature.

The in-orbit calibration is performed by the gain & phase adjusters 116*a*, 116*b* in both I & Q transmit paths 12*a*, 12*b*. These adjusters 116*a*, 116*b* can vary both amplitude and phase of the passing transmit signal. In other payload systems described previously, this gain & phase adjustment function was performed by the OBP (refer to FIGS. 2 and 3). The calibration algorithm is typically the same as other payload system block-diagrams herein and is described on FIG. 9.

Figure 5:
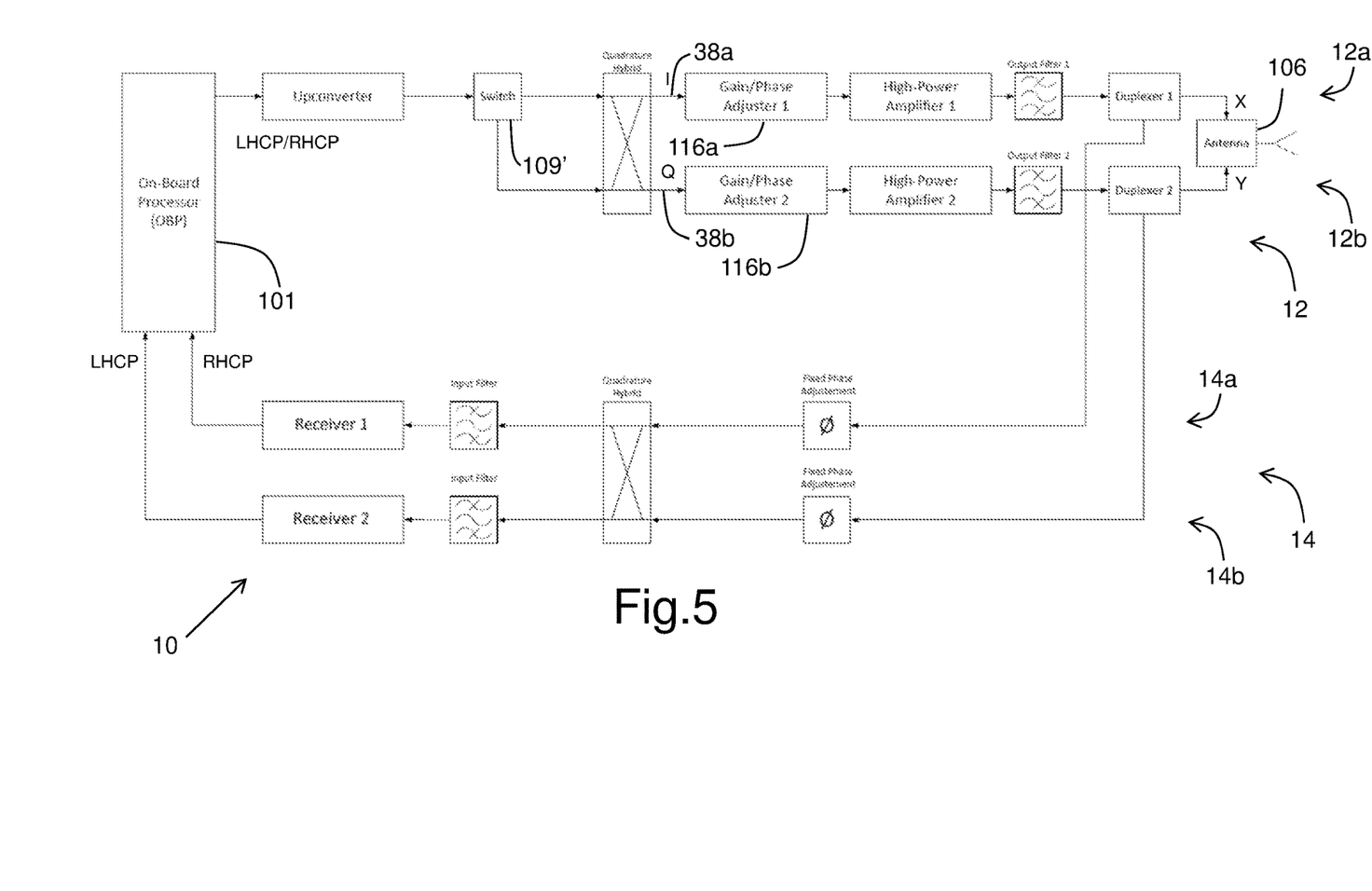
FIG. 5 is a schematic block-diagram for high-power flexible-polarization payload application. Gain & phase adjusters are present in the transmit path. The receive path polarization is selected by the OBP and the transmit path polarization is selected by a switch in accordance with another illustrative embodiment of the present invention.

FIG. 5 is a schematic block-diagram for high-power flexible-polarization payload architecture. Gain & phase adjusters 116*a*, 116*b* are present in the transmit chain 12. The receive path polarization is selected by the OBP 101 and the transmit path polarization is selected by a switch 109' in accordance with another illustrative embodiment.

The detailed description of FIG. 5 is the same as FIG. 4 with the exception that receive selection switch 109 is removed and its function replaced by an extra function within the OBP 101. The latter selects which of the two polarizations is used in the receive chain 14. Phase tracking requirements are typically the same as described in FIG. 4 detailed description. In-orbit calibration is also the same as described in FIG. 4 detailed description.

Compared with FIG. 4, the advantages of the RX chain 14 is the improved G/T performance due to the removal of the RF switch 109 and the reduced loss of the RX signal during switching. However, a disadvantage is the cost of an additional filter and receiver.

Figure 6:
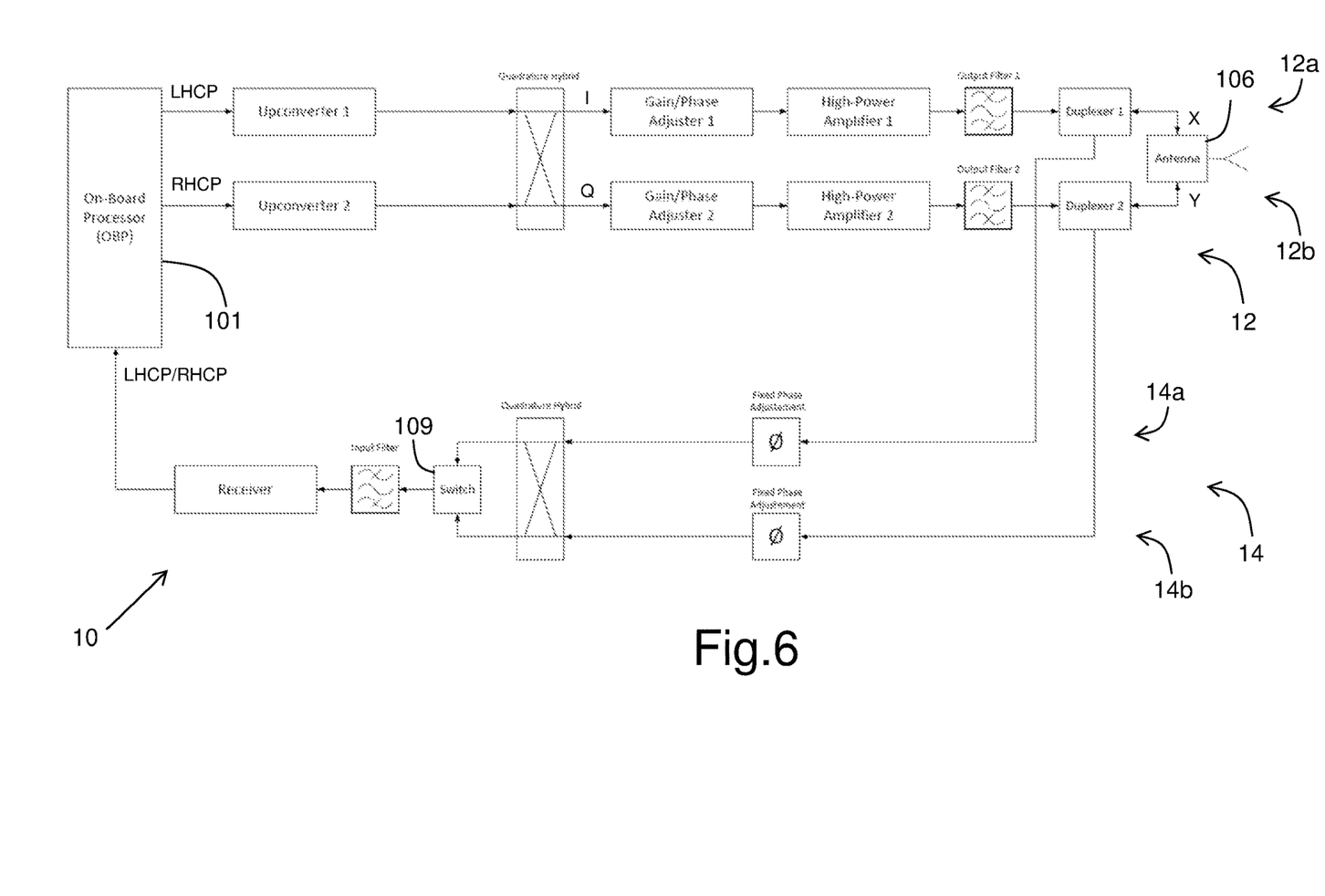
FIG. 6 is a schematic block-diagram for high-power flexible-polarization payload application. Gain & phase adjusters are present in the transmit path. The transmit path polarization is selected by the OBP and the receive path polarization is selected by a switch in accordance with another illustrative embodiment of the present invention.

FIG. 6 is a schematic block-diagram for high-power flexible-polarization payload application. Gain & phase adjusters 116a, 116b are present in the transmit paths 12a, 12b. The transmit path polarization is selected by the OBP 101 and the receive path polarization is selected by a switch 109 in accordance with another illustrative embodiment.

The detailed description of FIG. 6 is the same as FIG. 4 with the exception that transmit selection switch 109' is removed and its function replaced by an extra function within the OBP 101. The latter selects which of the two polarization is used in the transmit chain 12. Phase tracking requirements are typically the same as described in FIG. 4 detailed description. In-orbit calibration is also the same as described in FIG. 4 detailed description.

Compared with FIG. 4, the advantage of the TX chain 12 is the capability of seamless polarization selection switching by the OBP 101. However, a disadvantage is the cost of an added up-converter.

Figure 7:
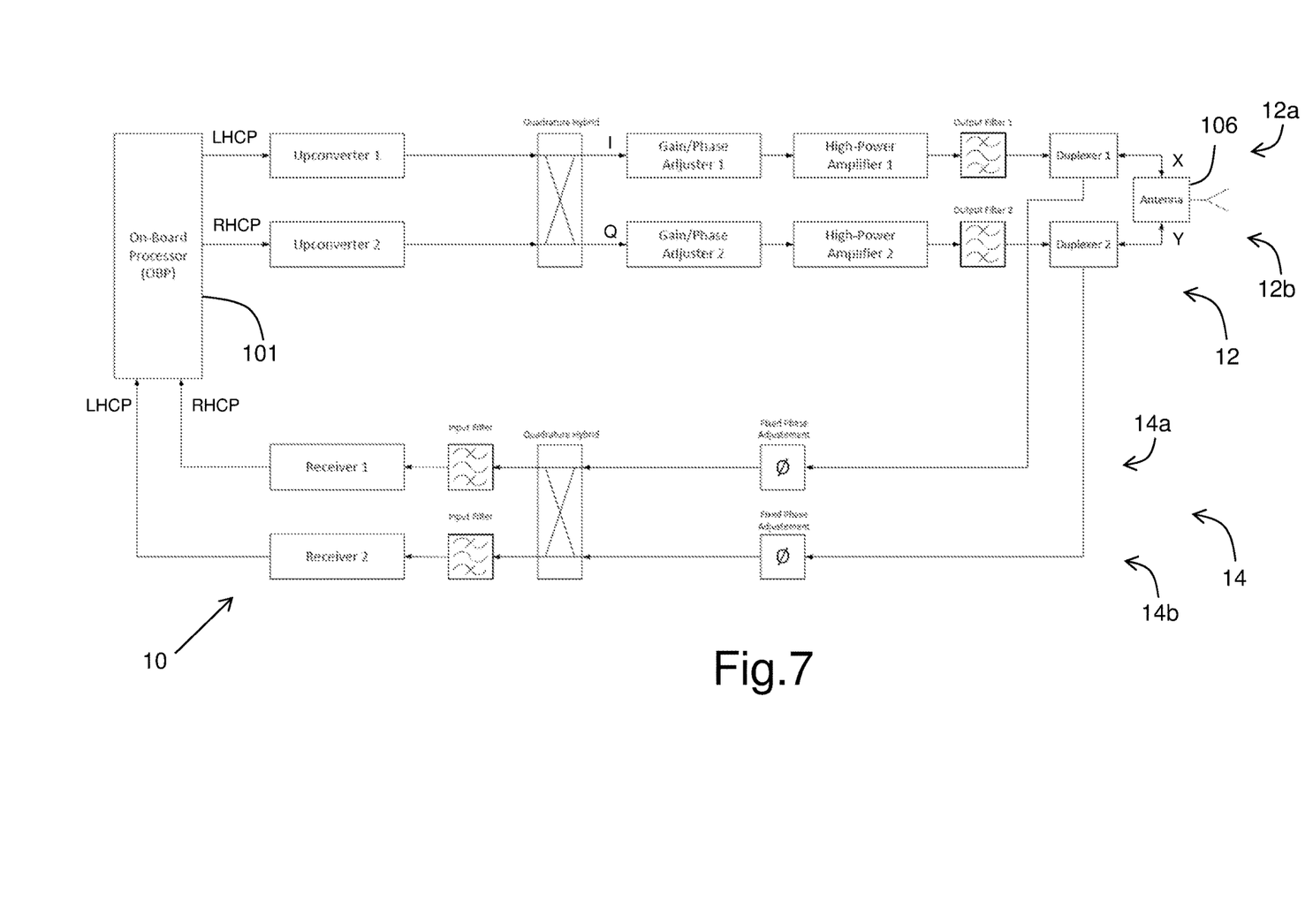
FIG. 7 is a schematic block-diagram for high-power flexible-polarization payload application. Gain & phase adjusters are present in the transmit path. The transmit and receive path polarizations are both selected by the OBP in accordance with another illustrative embodiment of the present invention.

FIG. 7 is a schematic block-diagram for high-power flexible-polarization payload application. Gain & phase adjusters 116a, 116b are present in the transmit paths 12a, 12b. The transmit and receive path polarizations are both selected by the OBP 101 in accordance with another illustrative embodiment.

The detailed description of FIG. 7 is the same as FIG. 4 with the exception that both transmit and receive selection switches 109', 109 are removed and their functions replaced by the OBP 101. The latter selects which of the two polarizations is used in the transmit 12a, 12b and receive 14a, 14b paths. Phase tracking requirements are typically the same as described in FIG. 4 detailed description. In-orbit calibration is also the same as described in FIG. 4 detailed description.

Compared with FIG. 4, the advantage of the TX chain 12 is the capability of seamless polarization selection switching by the OBP 101 with the cost of an added up-converter. The advantages of the RX chain 14 are the improved G/T performance and the reduced loss of the RX signal during switching with the cost of an additional filter and receiver.

Figure 8:
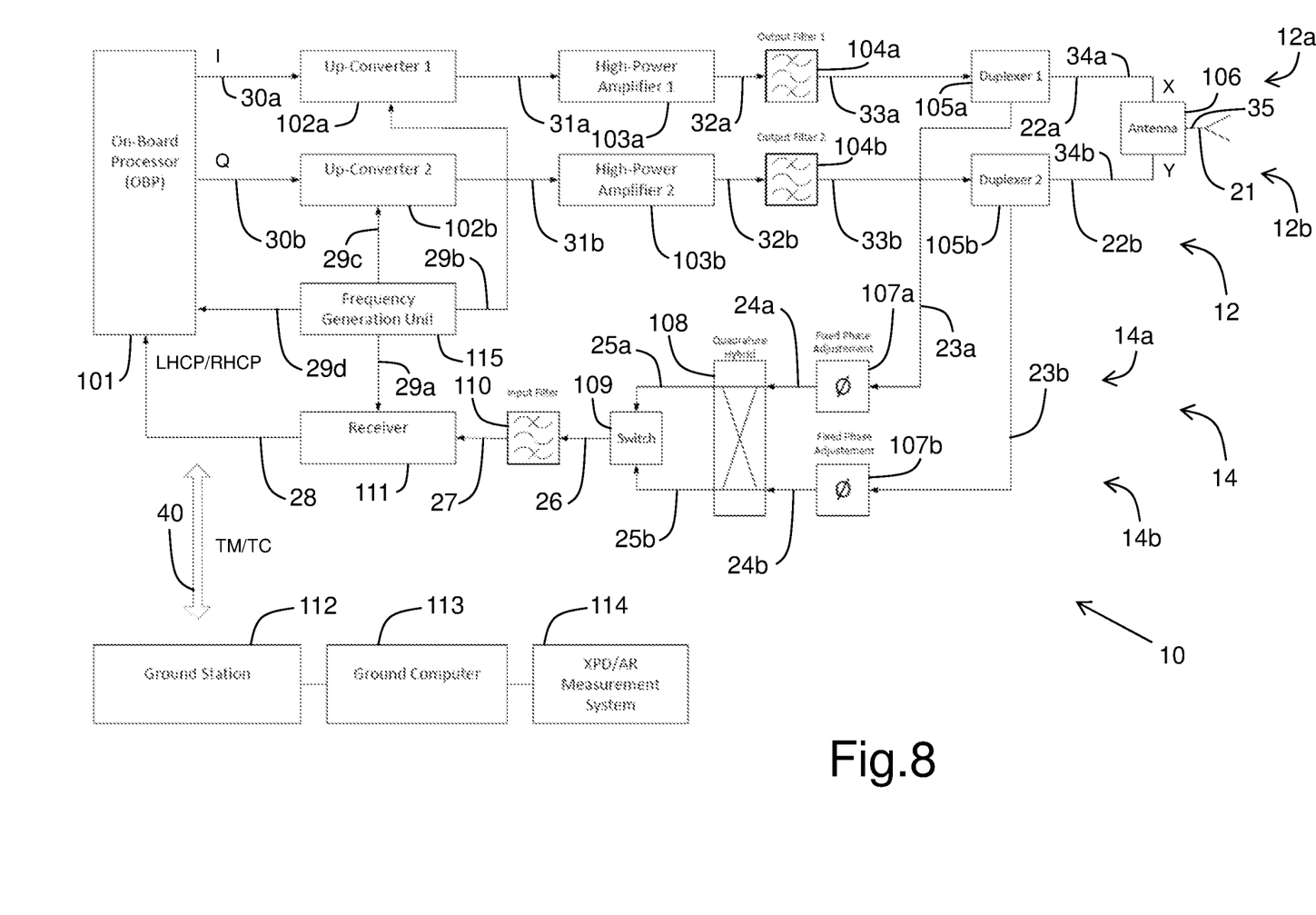

FIG. 8 is a schematic block-diagram of the calibration scheme for high-power flexible-polarization payload application. The satellite payload may be any one of the embodiments described earlier in FIGS. 2 to 7. In FIG. 8, the payload configuration of FIG. 2 is taken herein as an example with the addition of details on telemetry/telecommand (TM/TC) 40 and ground system.

Signals 21 & 35, 22a & 34a, 22b & 34b follow the same paths and are common to both receive and transmit operations, respectively. Typically, this is an RF/microwave signal which conveys binary data on a band-limited modulated carrier.

In transmit, the signals 34a, 34b, suitable for polarization X and Y respectively (typically, orthogonal linear polarizations), are combined within the antenna 106 and emitted with the suitable polarization (typically, left-handed or right-handed circular polarization) from the satellite payload to a terminal or ground station 112 on earth.

In receive, the receive input signal 21 is separated into signals 22a, 22b, which relative amplitude and phase is directly related to the signal 21 polarization received by the antenna 106 (typically, left-handed or right-handed circular polarization). The duplexers 105a, 105b allow separating the transmit signals from the receive signal by frequency-division duplexing, time-division duplexing, or half duplexing, and the received signals 22a, 22b are thus routed to the receive paths 14a, 14b, as signals 23a, 23b. The fixed phase adjustment 107a, 107b allows to compensate (equalize) the transmission phase of each receive signal paths to form signals 24a, 24b, which preserve the phase relation of signals 22a, 22b. The phase compensated signals 24a, 24b are combined in the quadrature hybrid 108 to form the two circularly polarized signals 25a, 25b, which is then selected by switch 109. The selected signal 26 is then subject to filtering via an input filter 110. The filtered signal 27 is then accepted by the receiver 111 which normally performs low-noise amplification and down-conversion to a lower intermediate frequency (IF), as signal 28. This intermediate frequency is again received by the OBP 101 for demodulation, data extraction and data regeneration as needed. The Frequency Generation Unit (FGU) 115 generates signals 29b, 29c and 29a which are the local oscillator (LO) signals of the frequency translation performed by the upconverters and receiver (102a, 102b and 111), respectively. Signals 29b-29c are phase tracked signals. Signal 29d is also generated by the FGU 115. Signal 29d is the clock signal for the OBP 101 and it is synchronous to the other FGU local oscillator signals.

In transmit, the OBP 101 formats the data and typically provides an "I" and "Q" output (signals 30a, 30b) which can be under the form of (but not limited to) digital data stream, or an intermediate frequency analog band-limited signal. This signal 30a, 30b is treated by the phase-tracked up-converter 102a, 102b which performs low frequency to TX frequency conversion (if needed), and performs suitable signal conditioning to generate the RF/microwave signal 31a, 31b. This signal 31a, 31b is normally at a low amplitude (typically below 1 Watt) and therefore needs further amplification to higher power. This is typically done using the high-power amplifier 103a, 103b, and signal 32a, 32b results. This high-power RF signal 32a, 32b requires filtering in order to ensure the removal of harmonics, and out-of-band noise & spurious, created by the high-power amplifier. This function is performed by the output filter 104a, 104b, and the filtered high-power signal 33a, 33b is fed to the duplexer 105a, 105b to be transmitted to the antenna 106 (signal 34a, 34b), where they get combined as output signal 35.

The flexible polarization payload is typically commandable and programmable via the ground system. This ground system comprises of the ground station 112 and computer 113 in addition to the cross-polarization discrimination (XPD) and/or the Axial Ratio (AR) measurement system 114.

This ground system performs the XPD/AR measurements, checks if requirements are met and, if necessary, calculates and sends gain & phase adjustment commands to the payload, via the TM/TC satellite link (signal 40).

Figure 9:
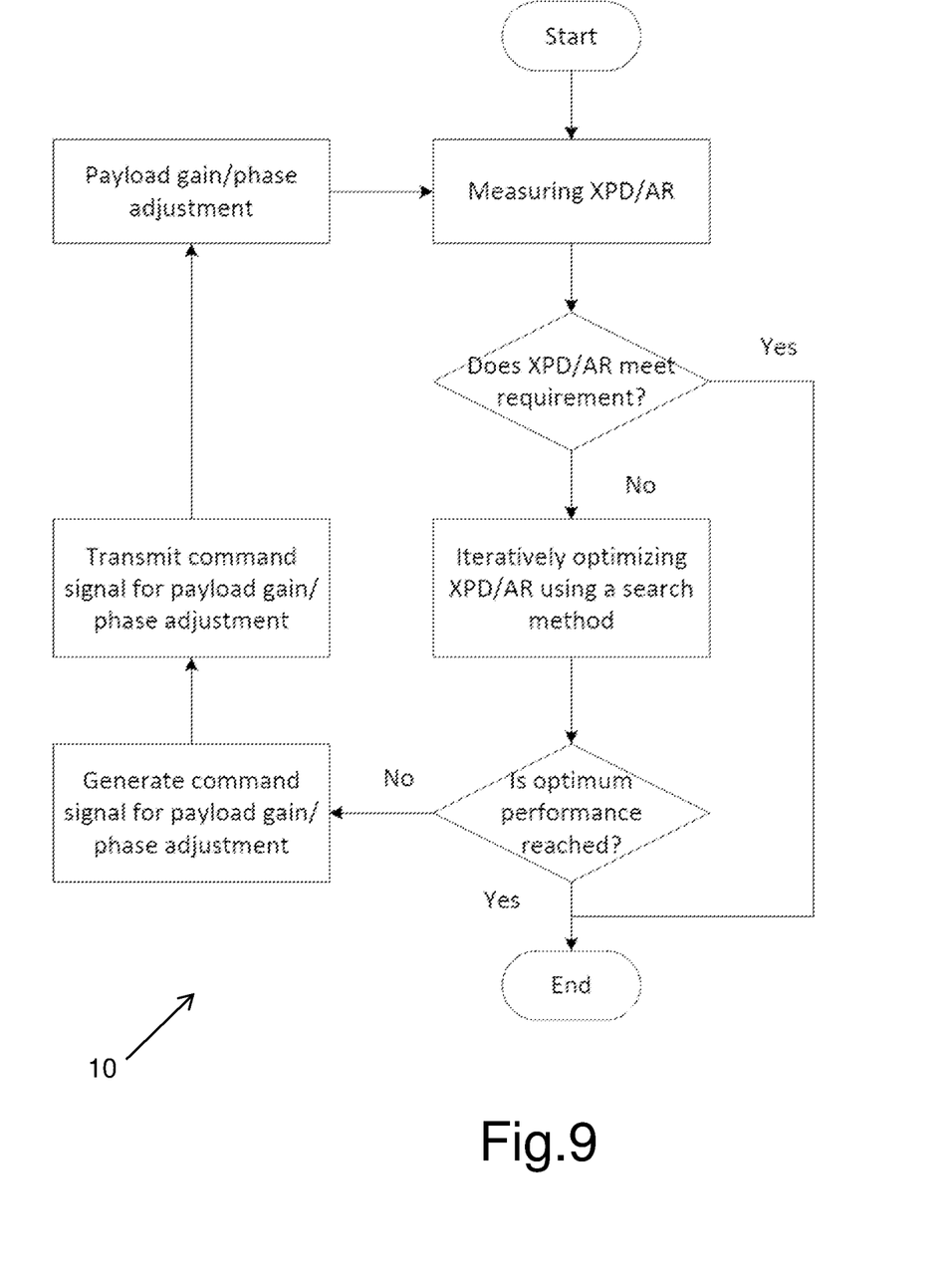
FIG. 9 is an illustration showing the payload calibration algorithm used in conjunction with the block-diagram of FIG. 8. By ground measurements of XPD/AR, this algorithm can be used to adjust (if necessary) the payload gain & phase to meet the system requirements.

FIG. 9 is a schematic showing the payload calibration algorithm used in conjunction with the block-diagram of FIG. 8. By ground measurements of XPD/AR, this algorithm adjusts (if necessary) the payload gain & phase to meet the system requirements.

The calibration algorithm starts by the measurements of the cross-polarization discrimination (XPD) and/or Axial Ratio (AR). It first checks if the requirement is met. If so, no action is performed. When the requirement is not met, the algorithm iteratively tries to optimize XPD/AR using a search method. This search method can be a pattern search, trust-region search, line search or any another type of search method. If the iterations have not reached an optimum performance, gain & phase adjustment commands are generated and sent to the communication payload as shown on FIG. 9. Once the iterations have reached the optimum performance, the XPD/AR performance should have been optimized and the algorithm stops no matter the requirement is met or not in order to avoid an endless iteration loop.

Figure 10:
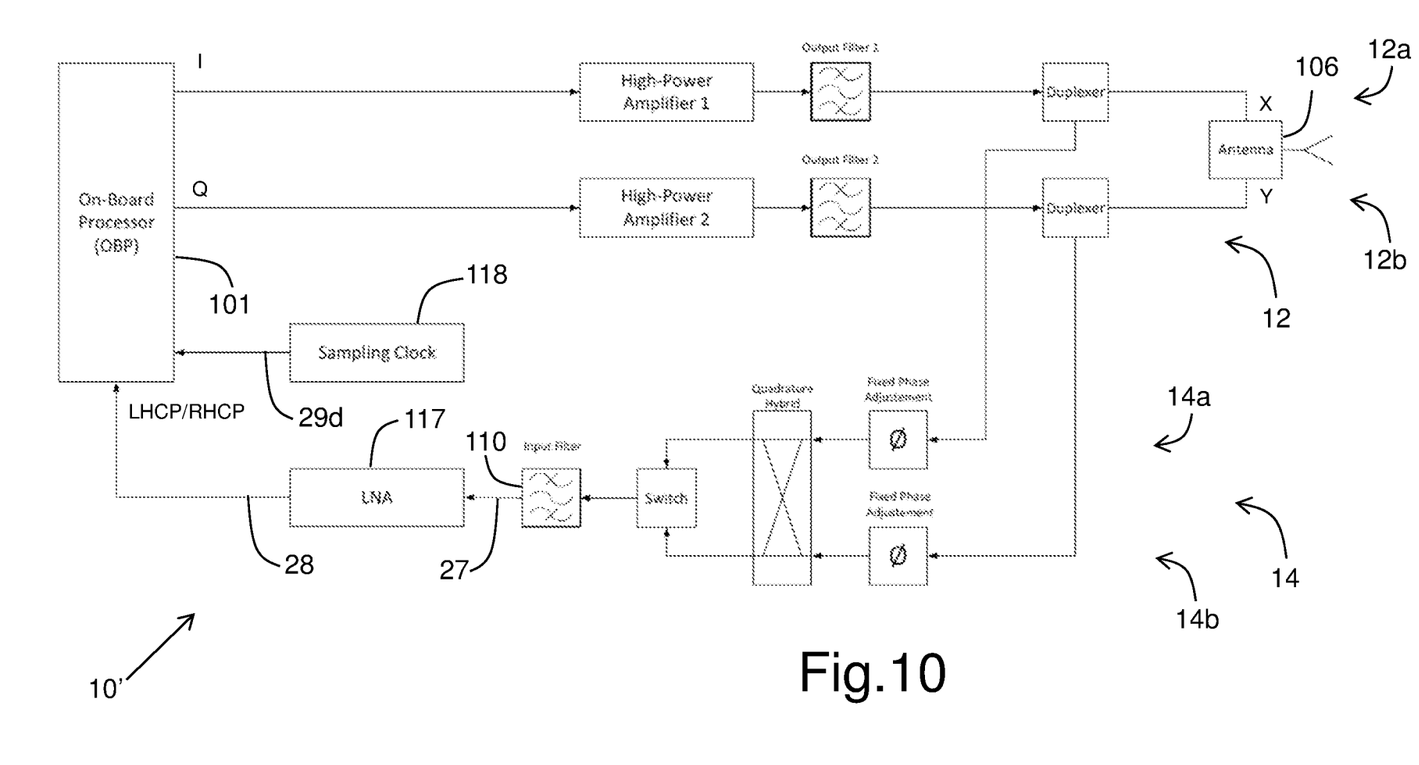
FIG. 10 is a schematic block-diagram similar to FIG. 2, for high-power flexible-polarization payload application with a polarization selection switch on the receive path in accordance with another illustrative embodiment of the present invention in which the OBP directly processes the RF signals.

FIG. 10 refers to a schematic block-diagram for high-power flexible-polarization payload application in accordance with another illustrative embodiment 10' similar to the embodiment of FIG. 2, although it could also similarly be implemented with any other embodiment. In this embodiment, the OBP 101 directly processes the RF/microwave signals, such that the upconverter(s) in the TX chain and/or the downconverter (s) (typically incorporated into the receiver(s)) in the RX chain are not required. Accordingly, in the RX chain 14, low-noise amplifier(s) (LNAs) 117 is/are therefore required to account for the replacement of the receiver(s) 111. Similarly, this would be applicable in all embodiments with the OBP directly processing the RF/microwave signals. In this specific embodiment, a sampling clock 118 is also required in replacement Frequency Generation Unit 115 to ensure that a clock signal 29*d* is provided to the OBP 101 for analog-to-digital and digital-to-analog conversion of all RF/microwave signals.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinabove described and hereinafter claimed.

We claim:

1. A method of calibrating a high-power flexible-polarization satellite payload system, the method comprising the steps of:
measuring cross-polarization discrimination and/or axial ratio performance of the system on the ground;
determining if the measured system performance is within a predetermined requirement range to stop calibration, if not, iteratively optimizing the measured system performance and determining if optimum system performance is reachable to stop calibration, and, if not, generating a command signal with compensation adjustments of respective phase and/or amplitude of in-phase and quadrature phase output signals; and
up-linking said command signal to the system via tele-command satellite link and repeating the preceding steps.

2. The method of claim 1, wherein iteratively optimizing is performed using a search method.

3. The method of claim 2, wherein the search method is one of a pattern search, a trust-region search, and a line search.

* * * * *